(12) United States Patent
Räther et al.

(10) Patent No.: US 11,047,828 B2
(45) Date of Patent: Jun. 29, 2021

(54) METHOD FOR CONTROLLING THE MASS FILTER IN A HYBRID IMS/MS SYSTEM

(71) Applicant: Bruker Daltonik GmbH, Bremen (DE)

(72) Inventors: Oliver Räther, Lilienthal (DE); Markus Lubeck, Bremen (DE)

(*) Notice: Subject to any disclaimer, the term of this patent is extended or adjusted under 35 U.S.C. 154(b) by 0 days.

(21) Appl. No.: 16/838,392

(22) Filed: Apr. 2, 2020

(65) Prior Publication Data

US 2020/0326302 A1 Oct. 15, 2020

Related U.S. Application Data

(60) Provisional application No. 62/833,868, filed on Apr. 15, 2019.

(51) Int. Cl.
| | |
|---|---|
| *G01N 27/622* | (2021.01) |
| *H01J 49/00* | (2006.01) |
| *H01J 49/40* | (2006.01) |
| *H01J 49/42* | (2006.01) |
| *G01N 27/623* | (2021.01) |

(52) U.S. Cl.
CPC ......... *G01N 27/622* (2013.01); *G01N 27/623* (2021.01); *H01J 49/0031* (2013.01); *H01J 49/40* (2013.01); *H01J 49/401* (2013.01); *H01J 49/4215* (2013.01)

(58) Field of Classification Search
CPC ............... G01N 27/622; G01N 27/623; G01N 33/6848; G01N 2560/00; H01J 49/0031; H01J 49/0045; H01J 49/40; H01J 49/401; H01J 49/4215
USPC ................................................ 250/282, 281
See application file for complete search history.

(56) References Cited

U.S. PATENT DOCUMENTS

| | | | |
|---|---|---|---|
| 6,960,761 B2 | 11/2005 | Clemmer | |
| 7,838,826 B1 | 11/2010 | Park | |
| 9,683,964 B2 | 6/2017 | Park et al. | |
| 9,891,194 B2 | 2/2018 | Mann et al. | |
| 2012/0273670 A1 | 11/2012 | Park et al. | |
| 2014/0197308 A1* | 7/2014 | Green | H01J 49/401 250/282 |
| 2020/0161112 A1* | 5/2020 | Remes | H01J 49/0036 |

FOREIGN PATENT DOCUMENTS

| | | |
|---|---|---|
| GB | 2421843 A | 7/2006 |
| GB | 2530835 A | 4/2016 |
| WO | 2015181563 A1 | 12/2015 |

OTHER PUBLICATIONS

Anonymous, "Innovation with Integrity TIMS-QTOF MS Flexibility to Empower Your Ideas", Bruker, 2017. URL: https://www.bruker.com/fileadmin/user_upload/8-PDF-Docs/Separations_Mass_Spectrometry/Literature/Brochures/1852680_timsTOF_brochure_05-2017.pdf.

* cited by examiner

*Primary Examiner* — Kiet T Nguyen
(74) *Attorney, Agent, or Firm* — Benoit & Côté Inc.

(57) ABSTRACT

The invention provides a method for acquiring as many fragment mass spectra of selected substances, e.g. proteins, of complex mixtures, as possible using a hybrid mass spectrometric system which comprises an ion source, an ion mobility separator, a mass filter, a fragmentation cell, and a mass analyzer. The fragment mass spectra are used for identifying the substances by their fragment mass spectra. The invention proposes to control the dwell time of the mass filter and to adapt the dwell time to the length of the ion mobility signal in a mass-mobility map.

16 Claims, 6 Drawing Sheets

METHOD FOR CONTROLLING THE MASS FILTER IN A HYBRID IMS/MS SYSTEM

BACKGROUND OF THE INVENTION

Field of the Invention

The invention relates to methods and devices for acquiring fragment mass spectra of selected precursor ions separated by ion mobility wherein the fragment mass spectra are used to identify substances in complex mixtures, in particular digest peptides in a bottom-up proteomics workflow, and optionally to quantify the substances.

Description of the Related Art

In protein science, there is an increasing interest in identifying as much peptides and proteins as possible in a liquid-chromatography/mass-spectrometry runs (LC-MS) of a proteolytic digest of proteins extracted from a biological sample. Hybrid mass spectrometric systems coupling ion mobility spectrometry (IMS) and mass spectrometry (MS) have proven to improve identification rates.

U.S. Pat. No. 6,960,761 ("Instrument for separating ions in time as functions of preselected ion mobility and ion mass"; Clemmer) discloses a hybrid IMS/MS spectrometric system which is shown in FIG. 1 and comprises an ion source, a drift type ion mobility separator, a quadrupole mass filter, an ion fragmentation cell, and a time-of-flight mass analyzer with orthogonal ion injection (OTOF-mass analyzer). An ion trap is used to accumulate ions upstream of the drift type mobility separator. The hybrid IMS/MS spectrometric system can optionally comprise an upfront substance separator, e.g. a liquid chromatograph (LC). Ions are separated in time according to ion mobility in the drift type mobility separator and mass spectra of the separated ions are acquired by the downstream OTOF-mass analyzer forming a mass-mobility map.

U.S. Pat. No. 7,838,826 ("Apparatus and method for parallel flow ion mobility spectrometry combined with mass spectrometry"; Park) discloses a compact ion mobility separator which is termed "trapped ion mobility spectrometer" (TIMS).

In a common embodiment, a gas flow drives ions in the separation unit against a counter-acting electric DC field barrier at which the ions get axially trapped and separated in space according to ion mobility during an accumulation phase. The ions are radially confined by a quadrupolar RF field. In a scan phase, the trapped ions are subsequently eluted from the electric DC field barrier in time by decreasing the height of axial electric DC field. Ions are successively released from low ion mobility to higher ion mobility.

The mobility resolution of a TIMS mobility separator increases for longer scan durations or by lowering the scan speed, respectively.

U.S. Pat. No. 9,683,964 ("Trapping ion mobility spectrometer with parallel accumulation"; Park and Schubert) discloses a TIMS separator with an accumulation unit located upstream of the separation unit for storing ions during the scan phase. TIMS with parallel accumulation provides the possibility to prolong the ion accumulation duration to find more detectable ion species without decreasing the acquisition rate for fragment mass spectra. The high acquisition rate for fragment mass spectra permits the repeated measurement of low abundance ion species to improve the quality of the fragment mass spectra.

U.S. Pat. No. 9,891,194 ("Acquisition of fragment mass spectra of ions separated by their mobility"; Mann et al.) discloses a multi-cycle method for acquiring fragment ion spectra of substances in complex mixtures using a hybrid mass spectrometric system shown in FIG. 2. The method has widely become known as "PASEF" (Parallel Accumulation Sequential Fragmentation), in particular for a bottom-up proteomics workflow.

FIG. 3 shows a flow diagram of the multi-cycle method for acquiring fragment mass spectra of multiple ion species. Both hybrid IMS/MS spectrometric systems shown in FIGS. 1 and 2 can be used to perform the multi-cycle method. The fragment mass spectra can be used for identifying the corresponding substances, in particular proteins of a proteome, and optionally for quantifying the substances.

In a first measurement cycle of a first loop, ions are separated in time according to mobility and mass spectra of the separated ions are acquired using a mass analyzer to form a mass-mobility map. Separated ion species of interest with distinct mass and mobility are selected from the mass-mobility map. In a second measurement cycle, fresh ions are separated in time according to mobility. The selected ion species of interest are isolated according to mass one after the other by the mass filter, fragmented in the fragmentation cell, and fragment mass spectra are acquired using the mass analyzer. In case that other ions species of interest can be selected from the mass-mobility map of the first measurement cycle, no new mass-mobility map is required and fragment mass spectra of the remaining ion species of interest are obtained in one or more additional measurement cycles. Otherwise, a second loop begins with the acquisition a new mass-mobility map. The loops with new mass-mobility maps can be repeated in time intervals of 0.5 to three seconds, for example depending on the time behavior of an upfront substance separation device.

SUMMARY OF THE INVENTION

In a first aspect, the invention provides a method for acquiring fragment mass spectra of substances in complex substance mixtures using a hybrid mass spectrometric system which comprises an ion source, an ion mobility separator, a mass filter, an ion fragmentation cell, and a mass analyzer. The method comprises the steps of: separating ions in time according to mobility by the ion mobility separator; isolating separated ion species of a pre-determined set sequentially according to mass by the mass filter; and fragmenting the isolated ion species in the fragmentation cell and acquiring fragment mass spectra by the mass analyzer, wherein the dwell time of the mass filter during the isolation is adapted for at least one of the ion species of the pre-determined set to the duration of the ion mobility signal of the at least one ion species after separation in the ion mobility separator.

The duration of the ion mobility signals can be estimated from the parameters of the ion mobility separator used during the separation or are preferably determined experimentally.

In a second aspect, the invention provides a method for acquiring fragment mass spectra of substances in complex substance mixtures using a hybrid mass spectrometric system which comprises an ion source, an ion mobility separator, a mass filter, an ion fragmentation cell, and a mass analyzer. In a first measurement cycle, ions are separated in time according to mobility and a mass-mobility map is measured by the mass analyzer from which at least one set of temporally separated virtual windows embracing ion species with distinct masses and distinct mobility scan times is selected. In a second measurement cycle, ions are again separated in time according to mobility. Each ion species of the at least one set is sequentially isolated by the mass filter, fragmented in the fragmentation cell, and measured by the mass analyzer as a fragment mass spectrum. The method is characterized by the fact that the temporal length of the windows and thus the dwell time of the mass filter are adapted to the duration of the ion mobility signal in the mass-mobility map.

Preferably, two or more sets are selected and the selected sets are distinctly different and do not contain the same ion species of the mass-mobility. However, weak ion signals from the mass-mobility map can be present in several sets and their fragment mass spectra are combined to increase their quality.

A second mass-mobility map for a second measurement loop can be measured when a predetermined time interval is over, when a predetermined number of fragment mass spectra is acquired or when all ion species of the present mass-mobility map are fragmented and measured as fragment mass spectra. The acquisition parameters of the first and second mass-mobility map can be different, for example with respect to the mobility range, scan duration or accumulation duration.

The duration of the ion mobility signals in the mass-mobility map can be estimated from the parameters of the ion mobility separator used during the separation or are preferably determined experimentally from the mass-mobility map of the first measurement cycle.

The methods according to the present invention preferably utilize a TIMS ion mobility separator, more preferably a TIMS with parallel accumulation. Most preferably, the mobility scan duration is then substantially equal to the ion accumulation duration. The introduction and use of a TIMS ion mobility separator instead of a drift tube mobility spectrometer is not just a simple replacement: different modes of operation offer several unique advantages, some of which become only visible by a deep study of the characteristics of TIMS. A TIMS ion mobility separator can, for example, be operated in a so-called temporal zoom mode with an increased mobility resolution in one or more mobility ranges as described in laid-open publication US 2012/0273670 A1. The increased mobility resolution is preferably achieved by reducing the speed with which the height of the electric DC field barrier is varied during a mobility scan. The mobility resolution in the limited region of interest can be higher than 100, in particular higher than 200, while the overall scan time of the TIMS ion mobility separator is less than 200 ms, in particular less than 100 ms.

Optionally, the substance mixture is at first separated by an upfront substance separator, e.g. a liquid chromatograph or an electrophoretic device, which is coupled to the ion source.

The mass filter is preferably an RF quadrupole mass filter. The RF quadrupole rod mass filter can be switched to the mass of the ion species to be measured next in such a way that the transmission through the mass filter first is closed, then tuned to the next mass, and then opened again at the correct time of the next ion species to be measured.

The fragmentation cell is preferably a flow-through cell in which the ions are not trapped. The ions are preferably fragmented by collision induced dissociation in a gas filled cell, but can also be fragmented by surface induced dissociation (SID), electron impact (EI), electron capture dissociation (ECD), electron transfer dissociation (ETD) or photon induced dissociation (either by using infrared or ultraviolet light sources).

The mass analyzer is preferably a time-of-flight analyzer with orthogonal ion injection (OTOF). OTOF mass analyzers offer a high acquisition rate of mass spectra combined with a high mass resolution. The acquisition rate is between 1 kHz and 20 kHz, typically around 10 kHz. A high mass resolution of more than 10,000, up to 100,000 or even more, typically around 30,000 to 50,000, can be achieved, in particular in the mass range of digest peptide ions generated with an electrospray source.

The dwell time of the mass filter is preferably a multiple of the scan duration of the mass analyzer and should be synchronized with the scans of the mass analyzer. For example, if a time-of-flight mass spectrometer is used and operated at an acquisition rate of 10,000 mass spectra per second, the acquisition of a single (fragment) mass spectrum has a duration of 100 microseconds. The minimum dwell time for the mass filter, therefore, should be 100 microseconds, and longer dwell times should be multiples of 100 microseconds each. Furthermore, the dwell times should be synchronized with the acquisition times of the time-of-flight mass analyzer, considering the delay by the transport of ions from the ion mobility separator through mass filter and fragmentation cell to the mass analyzer.

The temporal length of the windows and thus the dwell time of the mass filter can be substantially equal to the duration of the ion mobility signal in the mass-mobility map.

The temporal length of the windows and thus the dwell time of the mass filter can be longer than the duration of the ion mobility signal in the mass-mobility map by multiples of the scan duration of the mass analyzer, e.g. one to ten scan durations, in order to avoid the difficult process of synchronization. The synchronizing procedure may be difficult because of stray processes during the transport of the ions from the ion mobility separator to the mass analyzer. If the scan duration of the mass analyzer amounts to 100 microseconds, the selection process may pack 100 microseconds (or even 200 microseconds) each at the front and/or the end of the ion signals. With 100 microseconds at the front and at the end, the minimum selection time, and thus the minimum dwell time of the quadrupole mass filter, amounts to 300 microseconds. With 200 microseconds at each end, the minimum dwell time amounts to 500 microseconds, still resulting in a high number of selectable ion species per cycle.

In a third aspect, the invention provides power supply electronics for the quadrupole mass filter adapted to control and adjust the dwell time of the quadrupole mass filter for each ion species to the duration of the ion mobility signal as determined from a measured mass-mobility map or estimated from parameters of the ion mobility separator. The power supply electronics of the quadrupole mass filter allow fast switching from one filter state to the other and control of the dwell time.

DETAILED DESCRIPTION

Definitions

The term "dwell time" refers to the quadrupole mass filter and means the time interval in which the mass filter is open to let pass ions of a selected range of masses.

The term "selection time" or "selection interval" refers to the time interval around a selected ion signal in the mass-mobility map, used to control the dwell time of the quadrupole mass filter.

The term "selection window" denominates the parameters designating the mass range and the selection interval around a signal in the mass-mobility map, the parameters being used to control the opening of the quadrupole mass filter with respect to mass range and dwell time.

A "set of selection windows" means a temporal series of selected windows with as little time gaps as possible in between the windows, but without any overlapping.

The expressions "separator" and "separation" are used here for devices and methods which separate different substances or different ion species in time. Chromatography, capillary electrophoresis, and ion mobility spectrometry are separation methods. The term "filter" is applied to devices and methods which let pass only selected ion species from a larger variety offered. An example is the RF quadrupole mass filter, capable to filter ions by mass.

The term "measurement loop" is used here in a special meaning, starting with the measurement of a new mass-mobility map and the selection of sets of non-overlapping selection windows, followed by several fragment mass spectrum measurement cycles.

A "fragment mass spectrum measurement cycle", in short "cycle" or "measurement cycle", starts with the transfer of fresh ions from the accumulation unit to the ion mobility scan unit, and measures a set of fragment mass spectra from the ion species in a set of selection windows, selected from the mass-mobility map.

The "mobility scan time" or "mobility scan duration" is defined as duration of an ion mobility scan over an interesting range of ion mobilities, usually the range of the mobilities of the ions stored.

Exemplary Embodiments

While the invention is shown and described with reference to a number of different embodiments thereof, it will be recognized by those skilled in the art that various changes in form and detail may be made herein without departing from the scope of the invention as defined by the claims.

Figure 1:
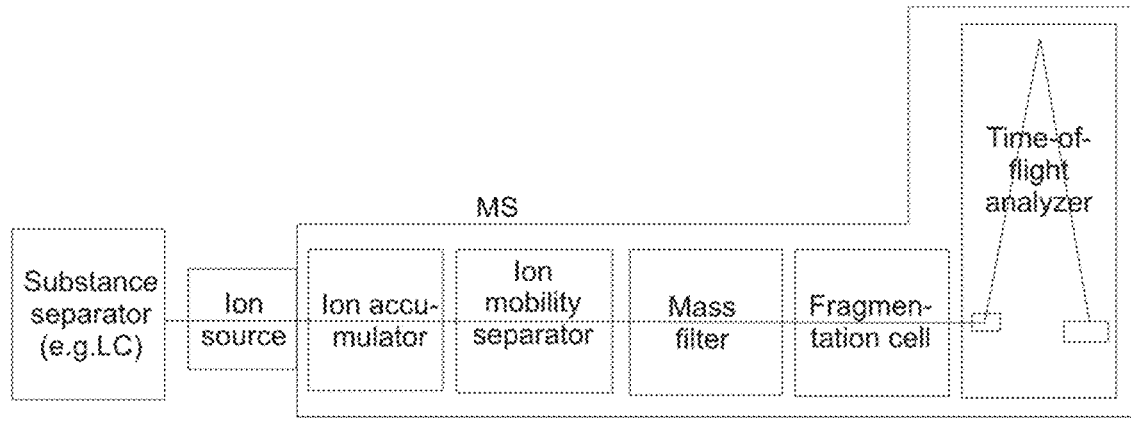
FIG. 1 shows a schematic representation of a prior art hybrid IMS/MS system which comprises an ion source, an ion trap, a drift type mobility separator, a quadrupole mass filter, an ion fragmentation cell, and a downstream high-resolution time-of-flight mass analyzer with orthogonal ion injection (OTOF-mass analyzer), and which is coupled to an upfront substance separator, e.g. a liquid chromatograph (LC).
Figure 2:
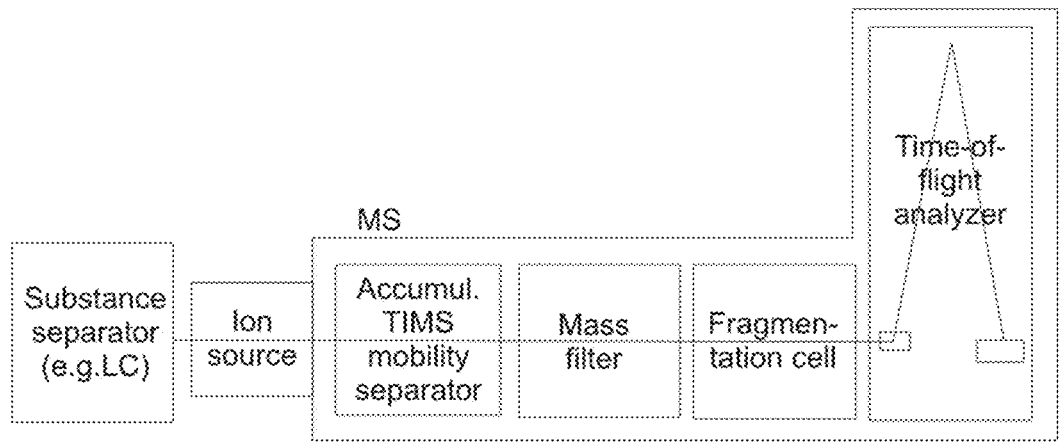
FIG. 2 shows a schematic representation of a prior art IMS/MS system which comprises a TIMS mobility separator with parallel accumulation as ion mobility separator.
Figure 3:
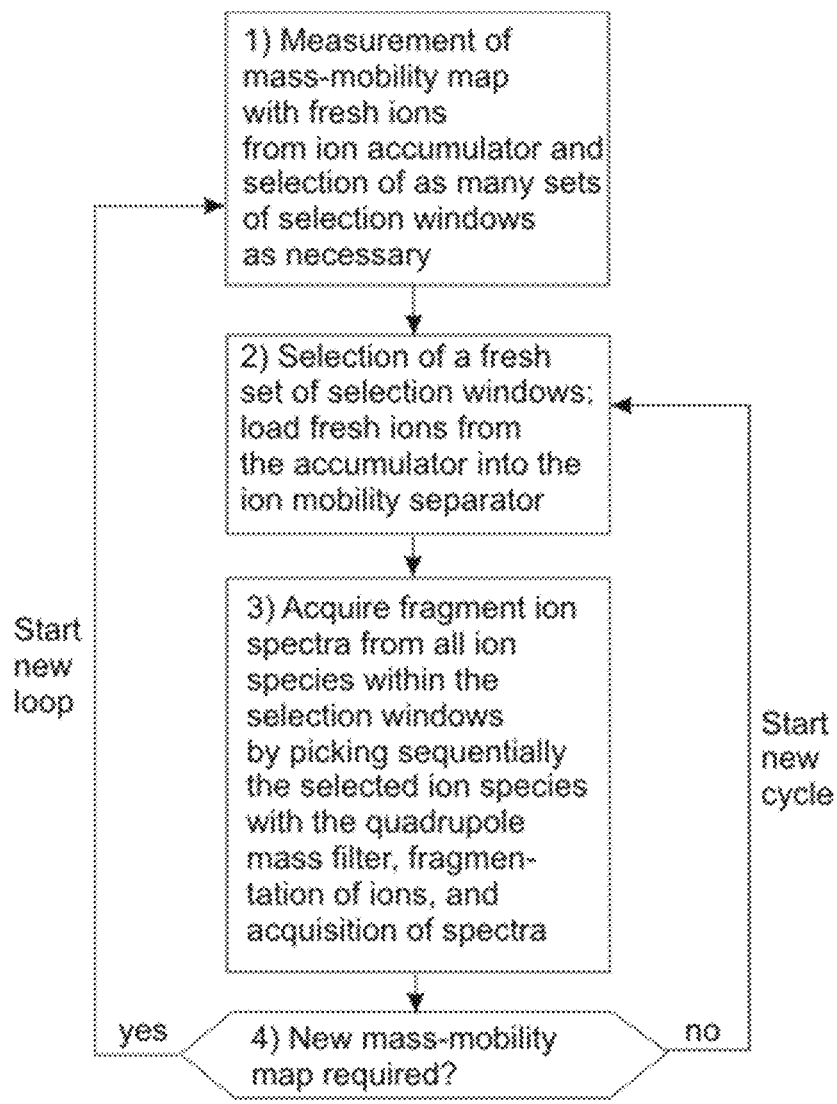
FIG. 3 shows a flow diagram of a multi-cycle method for acquiring fragment mass spectra of multiple ion species. Both hybrid IMS/MS systems shown in FIGS. 1 and 2 can be used to perform the multi-cycle method.

According to the prior art, the dwell time of a mass filter, which is a part of a hybrid IMS/MS system as shown in FIGS. 1 and 2 and used for acquiring fragment mass spectra of selected ion species, is equal for all isolated ion species, in particular for the multi-cycle method shown in FIG. 3.

Figure 4:
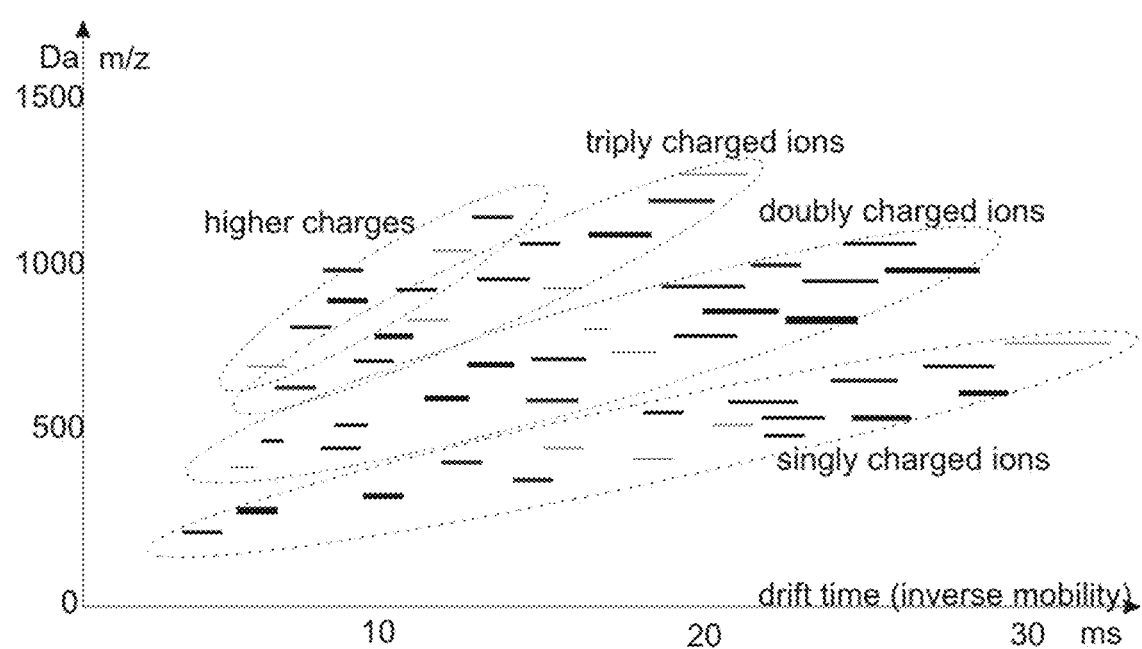
FIG. 4 shows a simulated mass-mobility map measured using the hybrid IMS/MS system shown in FIG. 1.
Figure 5:
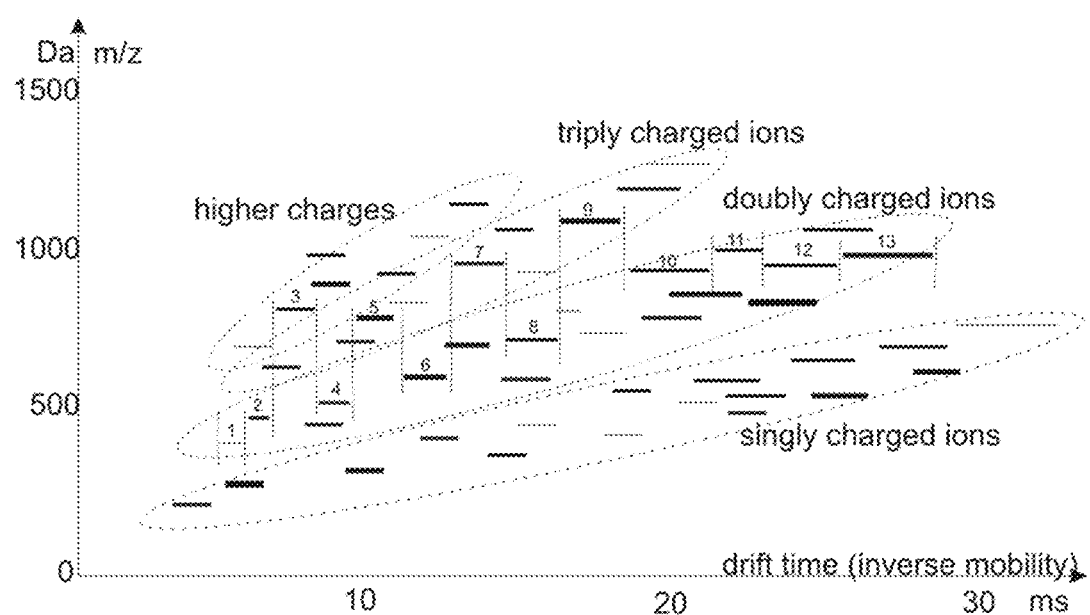
FIG. 5 shows a set of ion species (1) to (13) selected in the mass-mobility map shown in FIG. 4 wherein the durations of the ion mobility signals of these ion species (1) to (13) are determined from the mass-mobility map and used to control the dwell times of the quadrupole mass filter in a subsequent measurement cycle.
Figure 6:
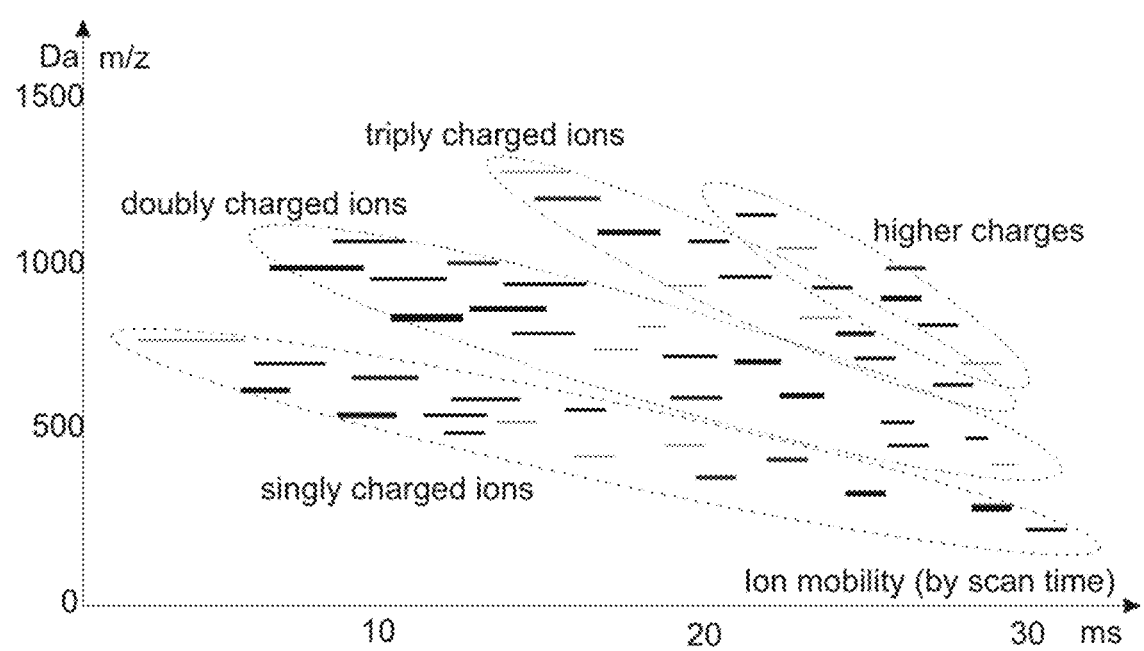
FIG. 6 shows a simulated mass-mobility map measured using the hybrid IMS/MS system shown in FIG. 2.

FIGS. 4 and 6 show simulated mass-mobility maps acquired using the hybrid IMS/MS systems shown in FIGS. 1 and 2, respectively. Each mass-mobility map is acquired without mass filtering and fragmentation, and shows three distinct subsets of ion species for different charge states. The mass-mobility map of FIG. 6 is acquired using a TIMS separator and differs from the mass-mobility map of FIG. 4, which is acquired using a drift-type mobility separator. The ion species leave the TIMS mobility separator in the order of their mobilities (lowest mobility first), not in the sequence of inverse mobilities (highest mobility first). A detailed analysis of mass-mobility maps shows that the duration of the ion mobility signal varies between the ion species. This fact is indicated in FIGS. 4 and 6 (and corresponding FIGS. 5 and 7) by line signals of different length; the thickness does not show variations in mass but indicates the intensity of the signals. In the direction of m/z, the signals present the usual isotope distributions (not visible in FIGS. 4 to 7).

The duration of the ion mobility signal of an ion species during a single mobility separation depends, for example, on the time at which the ion species leaves the ion mobility separator and, in particular, on the number of configurational isomers which are not resolved by the ion mobility separator. In the case of a temporal zoom used within a TIMS separation, the duration of an ion mobility signal depends on the instantaneous scan speed of the TIMS mobility separator. The duration of the ion mobility signal of "zoomed" ion species is longer than the ion mobility signal of ion species which are not part of the temporal zoom. Therefore, the dwell time of the mass filter needs to be adjusted to use all ions of "zoomed" ion species without decreasing the overall number of ion species by using a constant (long) dwell time of the "zoomed" ion species. The advantage of adjusting the dwell time compared to a constant dwell time is that the number of selectable ion species in a single mobility separation can be increased, in particular by about a factor of two, doubling the number of fragment spectra per cycle.

FIG. 5 shows the mass-mobility map of FIG. 4 with a selected set of non-overlapping ion species (1) to (13). According to the present invention, the dwell time of the quadrupole mass filter is adapted to the duration of the selected ion mobility signals which are determined from the mass-mobility map.

Figure 7:
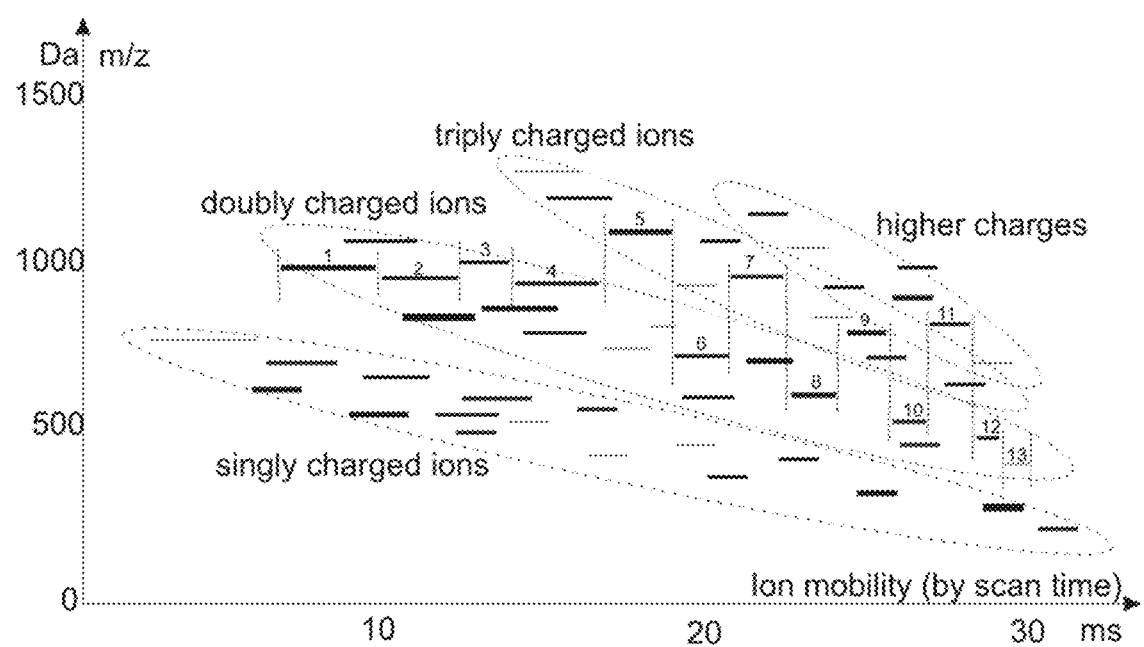
FIG. 7 shows a set of ion species (1) to (13) selected in the mass-mobility map shown in FIG. 6 wherein the durations of the ion mobility signals of these ion species (1) to (13) are determined from the mass-mobility map and used to control the dwell times of the quadrupole mass filter in a subsequent measurement cycle.

FIG. 7 shows the mass-mobility map of FIG. 6 with a selected set of non-overlapping ion species (1) to (13). According to the present invention, the dwell time of the quadrupole mass filter is adapted to the duration of the selected mobility signals which are determined from the mass-mobility map.

Depending on the variation in duration of the ion mobility signals, the proposed adaptation of the dwell time of the mass filter enables selecting sets of selection windows with a considerably increased number of ion species per measurement cycle compared to the method used in the prior art. With usual mixtures of complex digest peptides, the increase can amount to about a factor of two or three, doubling or tripling the number of fragment spectra per cycle.

The invention has been shown and described above with reference to a number of different embodiments thereof. It will be understood, however, by a person skilled in the art that various aspects or details of the invention may be changed, or various aspects or details of different embodiments may be arbitrarily combined, if practicable, without departing from the scope of the invention. Generally, the foregoing description is for the purpose of illustration only, and not for the purpose of limiting the invention which is defined solely by the appended claims, including any equivalent implementations, as the case may be.

The invention claimed is:

1. A method for acquiring fragment mass spectra of substances in a complex substance mixture using a hybrid mass spectrometric system that includes an ion source, an ion mobility separator, a mass filter, an ion fragmentation cell, and a mass analyzer, the method comprising:
    temporally separating ion species of the complex substance mixture according to mobility using the ion mobility separator, wherein different ion species have different ion mobility signal durations;
    isolating separated ion species of a predetermined set sequentially according to mass using the mass filter, wherein a dwell time of the mass filter is different for different ion species that have different ion mobility signal durations; and
    fragmenting the isolated ion species in the fragmentation cell and acquiring fragment mass spectra using the mass analyzer.

2. The method according to claim 1, wherein the ion species of the predetermined set, which are sequentially isolated using the mass filter, are selected from a premeasured mass-mobility map from which ion mobility scan times and ion masses of ion species of the complex substance mixture may be determined.

3. The method according to claim 2, wherein the dwell time of the mass filter for a given ion species of the predetermined set is substantially equal to the duration of the ion mobility signal for that ion species.

4. The method according to claim 3, wherein the dwell time of the mass filter for a given ion species of the predetermined set is substantially equal to a multiple of the scan duration of the mass analyzer, and is synchronized with the scans of the mass analyzer.

5. The method according to claim 2, wherein the scan duration of the mass analyzer is approximately 100 microseconds and the dwell time of the mass filter is a multiple of 100 microseconds.

6. The method according to claim 2, wherein the dwell time of the mass filter for a given ion species of the predetermined set is longer than a duration of the ion mobility signal for that ion species in the mass-mobility map by at least one to four scan durations of the mass analyzer.

7. The method according to claim 2, wherein the scan duration of the mass analyzer amounts to 100 microseconds, and the dwell time of the mass filter for a given ion species of the predetermined set is longer than the duration of the ion mobility signal in the mass-mobility map by 200 microseconds at a front and 200 microseconds at an end of the ion signal in the mass-mobility map.

8. The method according to claim 2, wherein two or more predetermined sets are selected from the premeasured mass-mobility map and the selected sets are distinctly different and do not contain the same ion species of the mass-mobility map.

9. The method according to claim 2, wherein two or more predetermined sets are selected from the premeasured mass-mobility map and ion species of weak ion signals from the premeasured mass-mobility map are present in several selected sets, and wherein fragment mass spectra of the ion species of weak ion signals are combined to increase their quality.

10. The method according to claim 2, wherein the premeasured mass-mobility map is a first mass-mobility map, and wherein the steps of the method are repeated using a second mass-mobility map following at least one of: the expiration of a predetermined time interval; the acquisition of a predetermined number of fragment mass spectra; or the fragmenting and measurement as fragment mass spectra of all ion species of the first mass-mobility map.

11. The method according to claim 10, wherein a mobility range of the second mass-mobility map differs from a mobility range of the first mass-mobility map.

12. The method according to claim 11, wherein an ion accumulation duration of the second mass-mobility map differs from an ion accumulation duration of the first mass-mobility map.

13. The method according to claim 2, wherein the ion mobility separator comprises a trapped ion mobility spectrometer (TIMS) with parallel ion accumulation.

14. The method according to claim 13, wherein ion mobility scan durations of the TIMS substantially equal ion accumulation durations of the TIMS.

15. The method according to claim 2, wherein the mass analyzer comprises a time-of-flight mass analyzer with orthogonal ion injection (OTOF).

16. The method according to claim 2, wherein the complex substance mixture is generated using at least one of a liquid chromatograph and a capillary electrophoresis unit.

* * * * *